Patented June 12, 1923.

1,458,651

UNITED STATES PATENT OFFICE.

VICTOR MORITZ GOLDSCHMIDT, OF CHRISTIANIA, NORWAY.

PROCESS FOR THE PRODUCTION OF CALCIUM CHLORIDE.

No Drawing.    Application filed January 13, 1922.    Serial No. 529,063.

*To all whom it may concern:*

Be it known that I, VICTOR MORITZ GOLDSCHMIDT, a subject of the King of Norway, residing at Christiania, Norway, have invented certain new and useful Improvements in Processes for the Production of Calcium Chloride, and I do hereby declare the following to be a full, clear, and exact description of the invention, such as will enable others skilled in the art to which it appertains to make and use the same.

This invention relates to the production of calcium chloride. Anhydrous calcium chloride is generally produced from calcium-chloride-hydrate by heating. On account of the great consumption of fuel necessary, the costs of the production of the anhydrous calcium-chloride in this manner are high, and in addition it is very difficult by these means to get the last traces of water separated so that the chloride may be used for the production of calcium metal.

The present invention relates to a process by which it is possible by simple means and with small costs to produce anhydrous or nearly anhydrous calcium chloride from limestone or other calcium carbonate material. It has previously been suggested to utilize calcium carbonate as an initial material for the production of calcium chloride, chlorine gas having been brought to act upon a melted mass containing calcium carbonate. The present invention is based upon the observation that calcium-carbonate reacts with chlorine under formation of calcium chloride, carbon dioxide and oxygen, already at temperatures where the calcium carbonate is in solid state and without having the carbonate suspended in the melted mass. The reaction may be illustrated by the following equation:

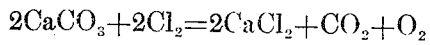

$$2CaCO_3 + 2Cl_2 = 2CaCl_2 + CO_2 + O_2$$

The reaction takes place already at temperatures below the dissociation temperature of the calcium carbonate under atmosphere pressure. The reaction takes place at temperatures above 400° C. and is already very quick at 500–600° C.

The transformation into chloride takes place without the aid of reducing substances to bind the disengaged oxygen.

In accordance with this observation calcium chloride is produced according to the present invention by conducting the chlorine gas into contact with calcium carbonate at such temperatures and under such conditions that the reaction wholly or substantially takes place with solid unmelted calcium compounds. Hereby it is possible to produce directly from limestone (or marble), which may be obtained in an absolutely anhydrous condition completely anhydrous calcium chloride.

The process may suitably be carried out by using the counter-current principle. During the progress of the reaction the temperature may be regulated in different manners, for example by heating the reaction chamber from without.

By mixing the treated calcium carbonate with calcium oxide (for instance from 10–30% calcium oxide) one may obtain advantageously the maintenance of the necessary temperature (preferably between 400° and 600° C.) in the reaction chamber, the reaction between calcium oxide and chlorine taking place under great production of heat. Then the temperature may be regulated by means of a regulator of the chlorine-supply.

Because the reaction as mentioned above has a very complete progress, not only a complete utilization of the chlorine gas is possible, but one may also be able to carry out the chlorination with aid of much diluted chlorine gas, diluted for example with air, such as is the case with chlorine gas from the apparatuses of the electrolysis in fused baths. The completeness of the reaction makes it even possible to utilize it for the removal of the small percentage of chlorine from gases.

In the industrial execution of the process one can proceed in many different manners, making use of such apparatuses and measures which are ordinarily employed and previously proposed for the carrying out of reactions between gases and solid substances on an industrial scale. Thus stationary as well as rotary apparatuses or apparatuses provided with stirrers can be made use of. By the execution of the process the chlorination is carried out most advantageously at temperatures where the melting of the reaction mixture or of the products does not take place, because the working of the apparatus takes place to the greatest advantage with a wholly unmelted charge. The temperature should therefore not surpass 622° C., which is the melting point of the carbonate-chloride-mixture. When higher temperatures are used, the chlorination will not take place so completely, the particles of carbonate being easily enclosed in the melt and thereby withdrawn from the reaction. At temperatures above 650° C. the conditions of equilibrium become so unfavorable that the process would not be industrially applicable.

Dependent upon the nature of the calcium corbonate materials which are to be chlorinated is the construction of the apparatuses employed and the working conditions; the materials may be used in the form of a powder or in a more large-grained state. By suitable control of the quantity of chlorine gas in relation to the quantity of heated charge, through which the chlorine gas or the gaseous reaction products respectively have to pass before the gases are let out in open air, one can attain a wholly quantitative utilization of the chlorine gas, losses of chlorine and pollution of the atmosphere with chlorine gas being avoided.

Such complete utilization of the chlorine gas is attained in a most advantageous manner by using the counter-current principle, as mentioned above.

The calcium chloride obtained by the process can be utilized for the most different purposes, for example for desiccation, but is in a particularly prominent degree adapted to the electrolytical production of metallic calcium or calcium alloys. In carrying out the process for this purpose the chlorine gas obtained by the electroylsis may be used with advantage for the chlorination according to the present process, because it is possible, as mentioned above, to use with advantage hereto much diluted chlorine gas.

I claim:—

1. Process for the production of calcium chloride which consists in reacting upon heated calcium carbonate with chlorine gas in the absence of substantial quantities of reducing substances at temperatures, at which the charge to be reacted upon is in a solid condition.

2. Process according to claim 1 in which the reaction takes place at temperatures between 400° and 622° C.

3. Process according to claim 1 in which the calcium carbonate is reacted upon with chlorine gas diluted with inert gases.

4. Process according to claim 1 in which the chlorine gas is caused to react upon a mixture of calcium oxide and calcium carbonate, containing more of the carbonate than of the oxide.

In testimony that I claim the foregoing as my invention, I have signed my name in presence of two subscribing witnesses.

VICTOR MORITZ GOLDSCHMIDT.

Witnesses:
MOGERIS BŪGGE,
RANDI GŪNDERSEN.